(12) United States Patent
Inaba

(10) Patent No.: US 12,387,289 B2
(45) Date of Patent: Aug. 12, 2025

(54) APPARATUS, METHOD, AND STORAGE MEDIUM

(71) Applicant: CANON KABUSHIKI KAISHA, Tokyo (JP)

(72) Inventor: Midori Inaba, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 215 days.

(21) Appl. No.: 18/152,058

(22) Filed: Jan. 9, 2023

(65) Prior Publication Data

US 2023/0237614 A1 Jul. 27, 2023

(30) Foreign Application Priority Data

Jan. 24, 2022 (JP) ................. 2022-008800

(51) Int. Cl.
| | |
|---|---|
| G06T 3/40 | (2024.01) |
| G06F 3/147 | (2006.01) |
| G06T 7/40 | (2017.01) |
| G06T 11/00 | (2006.01) |
| G06T 15/20 | (2011.01) |
| G06T 15/50 | (2011.01) |
| G06V 10/60 | (2022.01) |
| G06V 20/10 | (2022.01) |
| G09G 5/02 | (2006.01) |
| H04N 1/60 | (2006.01) |
| H04N 9/64 | (2023.01) |

(52) U.S. Cl.
CPC ............. *G06T 3/40* (2013.01); *G06T 11/001* (2013.01); *G06T 2210/32* (2013.01)

(58) Field of Classification Search
CPC ....... G06T 15/20; G06T 15/50; G06T 15/506; G06T 7/40; G06T 7/70; G06T 19/20; G06T 5/92; G06T 5/50; G06T 5/77; G06T 2207/20081; G06T 2207/10152; G06V 10/60; G06V 20/10; G06V 40/171; G06N 21/00; G06N 21/55; G06N 21/57; G06N 21/4738; G06N 21/27; G06F 3/013; G06F 3/147; G01J 1/44; G01J 3/50; G01S 3/783; H04N 1/60; H04N 5/57–58; H04N 9/64–77; G09G 5/02; G09G 2320/06–0666; G09G 2320/0271–0276
See application file for complete search history.

(56) References Cited

U.S. PATENT DOCUMENTS

2008/0245979 A1* 10/2008 Banton ................. G01N 21/57
250/559.4
2015/0162372 A1* 6/2015 Yorimoto .......... H01L 27/14643
250/208.1

(Continued)

FOREIGN PATENT DOCUMENTS

JP 2011061731 A * 3/2011 ............... G06T 5/00
JP 2017098921 A 6/2017

*Primary Examiner* — Wesner Sajous
(74) *Attorney, Agent, or Firm* — Canon U.S.A., Inc. IP Division

(57) ABSTRACT

An apparatus includes an acquisition unit configured to acquire characteristic information of a target, and a determination unit configured to determine a resolution level of illumination information to be used in rendering, based on reflection information contained in the characteristic information. The determination unit decreases the resolution level with an increase in a width, which indicates spread of a component.

20 Claims, 16 Drawing Sheets

(56) References Cited

U.S. PATENT DOCUMENTS

| | | | |
|---|---|---|---|
| 2016/0258865 A1* | 9/2016 | Kawano | G01N 21/55 |
| 2017/0082720 A1* | 3/2017 | Robert | G01N 21/4738 |
| 2019/0120764 A1* | 4/2019 | Ishii | G01N 21/55 |
| 2019/0129674 A1* | 5/2019 | Kuwada | G06T 15/04 |
| 2022/0189137 A1* | 6/2022 | Inaba | H04N 19/80 |
| 2023/0131109 A1* | 4/2023 | Meier | G06T 7/75 |
| | | | 382/103 |

* cited by examiner

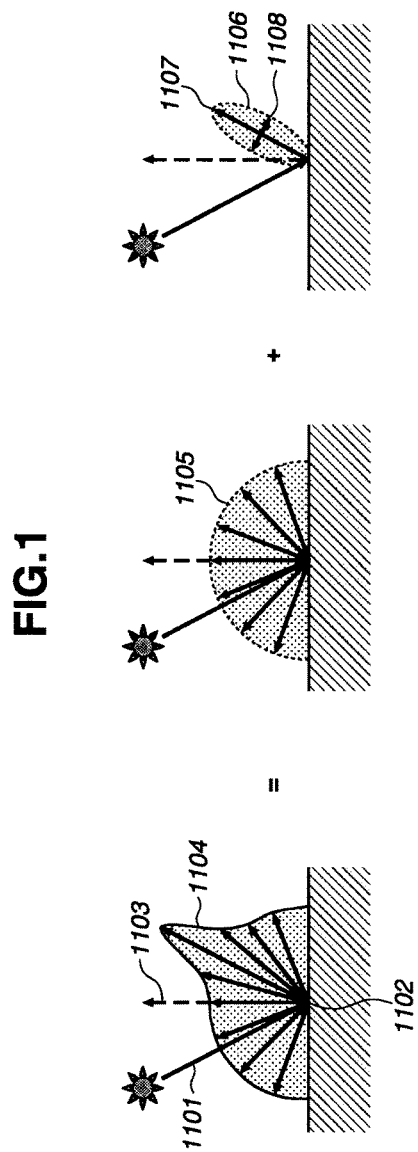

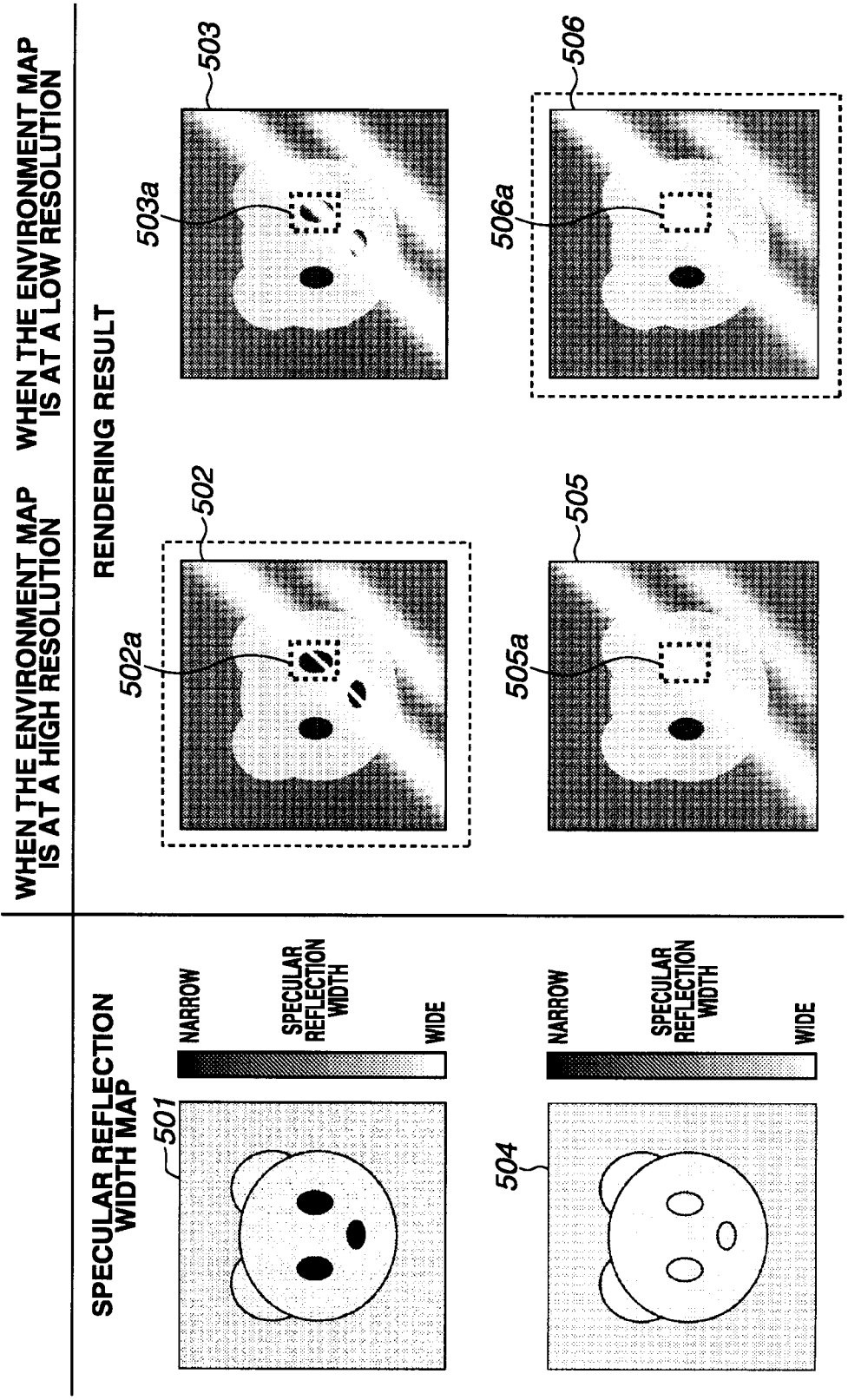

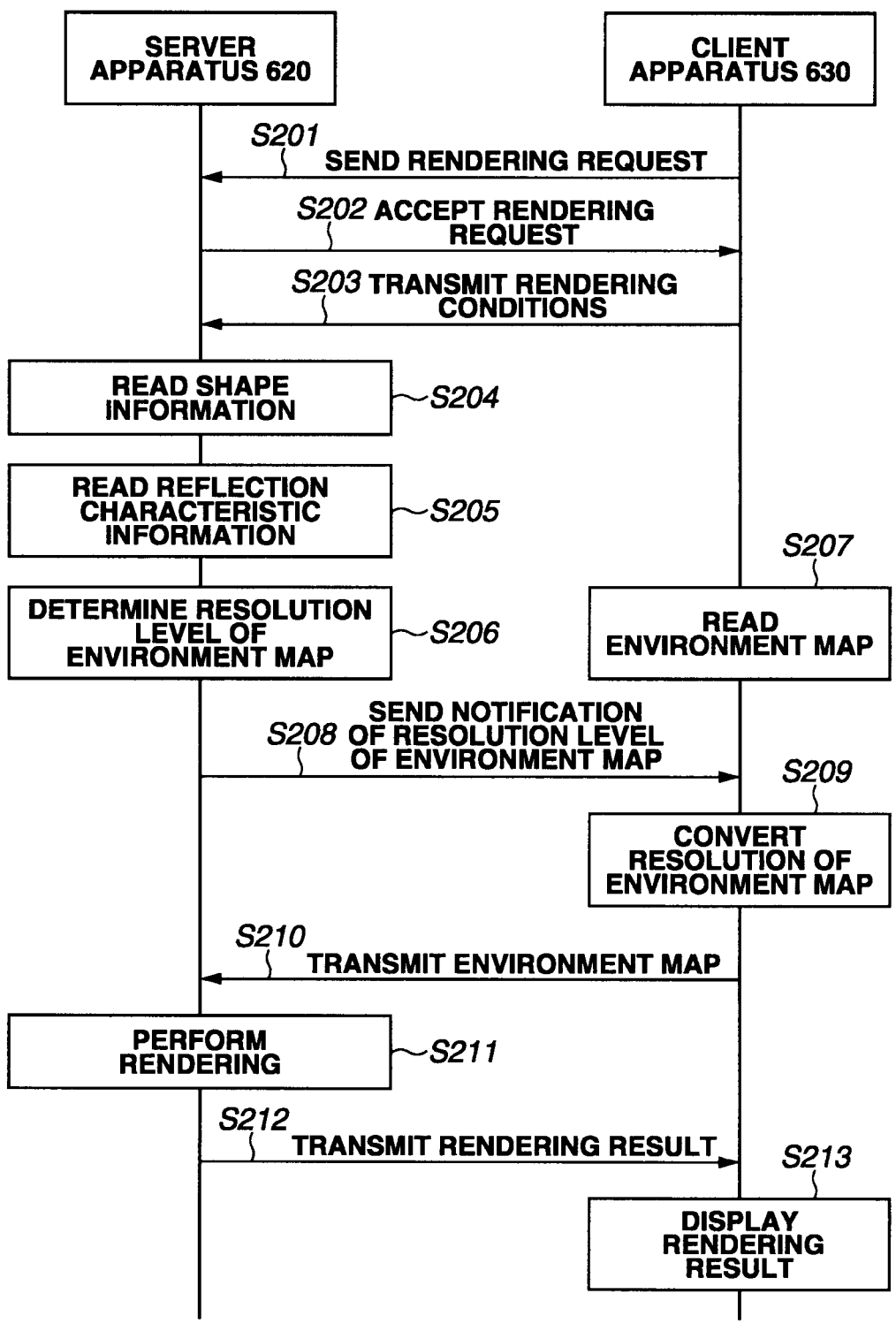

APPARATUS, METHOD, AND STORAGE MEDIUM

BACKGROUND

Technical Field

The aspect of the embodiments relates to a technique that performs processing using reflection characteristic information of an object.

Description of the Related Art

Recent improvement in the computer graphics (CG) technique contributes to reproduction of texture appearances of objects. The texture appearance means an impression received from unevenness, glossiness, and the like of an object surface in accordance with a material and is visually recognized based on reflection of illumination from the object. In a case where reproduction of a texture appearance close to reality using CG is desired, not only material information but also illumination information is important. Examples of commonly used techniques include a rendering method using an environment map as omnidirectional illumination information. An image or a video image captured by an omnidirectional camera or a fisheye lens is used for the environment map. Japanese Patent Application Laid-Open No. 2017-98921 discloses a method that determines an environment map region to be used, based on a range of a field of view specified at the time of rendering, and the resolution of the specified environment map region is set to be high.

Because the omnidirectional illumination information like the environment map contains a large amount of information and thus has disadvantages in terms of memory reading, saving, and communication, there is a demand for reducing the information amount. However, if the information amount in the illumination information is reduced, there arises an issue that reproduction of a texture appearance is deteriorated.

SUMMARY

According to an aspect of the embodiments, an apparatus includes an acquisition unit configured to acquire characteristic information of a target, and a determination unit configured to determine a resolution level of illumination information to be used in rendering, based on reflection information contained in the characteristic information.

Further features of the disclosure will become apparent from the following description of exemplary embodiments with reference to the attached drawings.

BRIEF DESCRIPTION OF THE DRAWINGS

FIG. 1 is a diagram illustrating reflection characteristics of an object.

FIG. 8 is a diagram illustrating beneficial effects achieved by the first exemplary embodiment.

FIG. 11 is a sequence diagram illustrating processing that is performed by the information processing system according to the second exemplary embodiment.

DESCRIPTION OF THE EMBODIMENTS

Figure 2A:
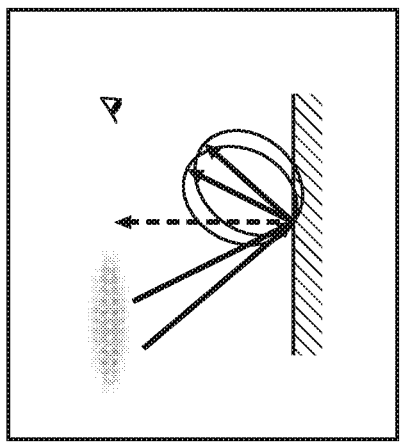
FIGS. 2A to 2D are diagrams each illustrating an influence of a specular reflection component on an appearance.

In the following description, exemplary embodiments of the disclosure will be described with reference to the drawings. The exemplary embodiments that will be described below are not intended to limit the disclosure, and not all of combinations of features that will be described in the present exemplary embodiments are necessarily essential to a solution of the disclosure. Descriptions will be given with same reference numerals each assigned to configurations similar to each other.

(Regarding Reflection Characteristics of Object)

Before the detailed description, reflection characteristics of an object will be described with reference to FIG. 1. FIG. 1 illustrates an intensity 1104 of reflected light when a point 1102 on a surface of an object having a normal direction 1103 is irradiated with light from a direction of a light source 1101. The light reflected on the surface of the object can be divided into a diffuse reflection component 1105 and a specular reflection component 1106. The diffuse reflection component 1105 is a component generated due to a diffuse reflection of incident light inside a measurement surface and is generally observed with an even intensity in every direction. On the other hand, the specular reflection component 1106 is a component regarding a glossy appearance that is generated due to a specular reflection of the incident light on the top of the measurement surface and is observed with a disproportionately enhanced intensity in an opposite direction (a specular direction) from an illumination direction with respect to the normal direction 1103. A component having a highest intensity in the specular reflection component 1106 (a maximum intensity) will be referred to as a specular reflection intensity 1107. A component indicating spread (diffusion) of the specular reflection component 1106 will be referred to as a specular reflection width 1108. On a surface of an object made from a material, such as a so-called less glossy material, the specular reflection intensity 1107 reduces/decreases and the specular reflection width 1108 increases.

(Influence of Specular Reflection Component on Appearance)

Figure 2B:
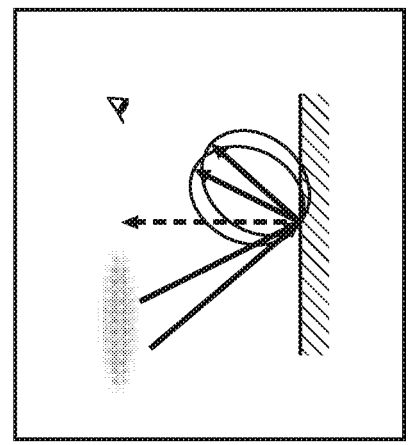
Figure 2C:
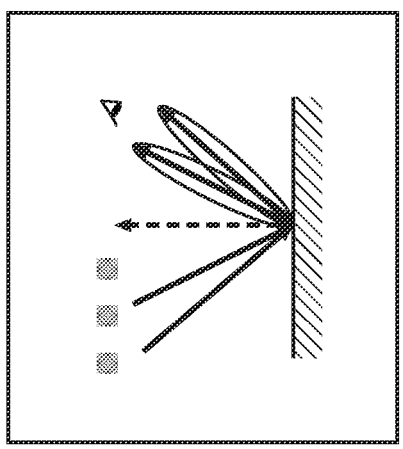
Figure 2D:
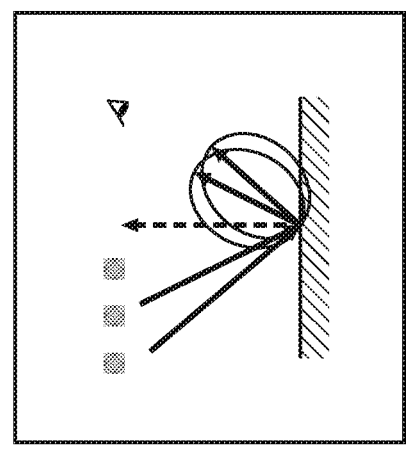

Next, an influence of the specular reflection component on an appearance will be described with reference to FIGS. 2A to 2D. FIG. 2A illustrates an example in which an environment map at a high resolution is provided to an object having a narrow specular reflection width as reflection characteristics. FIG. 2B illustrates an example in which an environment map at a low resolution is provided to the object having a narrow specular reflection width as reflection characteristics. FIG. 2C illustrates an example in which the environment map at a high resolution is provided to an object having a wide specular reflection width as reflection characteristics. FIG. 2D illustrates an example in which the environment map at a low resolution is provided to the object having a wide specular reflection width as reflection characteristics.

In the case of the object having a narrow specular reflection width as reflection characteristics, an appearance in which the environment map is reflected is acquired as an appearance observed based on reflection on the object as illustrated in FIG. 2A. Consequently, as illustrated in FIG. 2B, when the resolution of the environment map reduces, a blurred image of the environment map is reflected in the appearance observed based on reflection on the object, which causes a difference in the appearances. Thus, a reduction in the resolution of the environment map results in an insufficient reproduction of the texture appearance of the object.

On the other hand, in the case of the object having a wide specular reflection width as reflection characteristics, an appearance in which the environment map is reflected in a blurred state is acquired as an appearance observed based on reflection on the object as illustrated in FIG. 2C. Consequently, even when the resolution of the environment map reduces, a difference generated from the appearances observed based on reflection on the object is small, as illustrated in FIG. 2D. This means that a low resolution is sufficient for the environment map to reproduce the texture appearance. In light of the above descriptions, an information processing apparatus according to a first exemplary embodiment reduces a resolution level of an environment map to be used in rendering in a case where the rendering is performed on an object having a wide specular reflection width. This makes it possible to reduce the data amount of the environment map while preventing or reducing deterioration in reproduction of a texture appearance. The resolution level refers to information indicating how much the resolution of the environment map should be increased or how much the resolution of the environment map should be reduced. In other words, the resolution level refers to information which specifies a conversion of the resolution of the environment map.

(Configuration of Information Processing Apparatus According to First Exemplary Embodiment)

Figure 3:
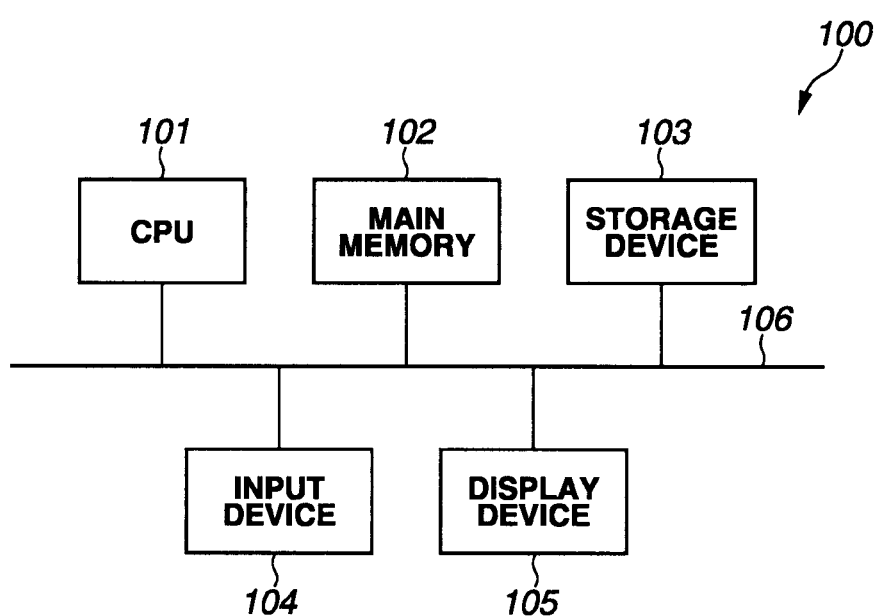
FIG. 3 is a diagram illustrating an example of the hardware configuration of an information processing apparatus according to a first exemplary embodiment.

FIG. 3 illustrates an example of a hardware configuration of the information processing apparatus according to the present exemplary embodiment.

An information processing apparatus 100 includes a central processing unit (CPU) 101, a main memory 102, a storage device 103, an input device 104, and a display device 105. Each of the units is connected to each other via a bus 106. The CPU 101 is in charge of control of the entire information processing apparatus 100. The CPU 101 executes a program stored in the main memory 102 or the like to realize processing procedures illustrated in flowcharts that will be described below. The main memory 102 stores therein various kinds of programs, data, and the like, necessary for the processing. The storage device 103 is a hard disk and stores various kinds of programs, data, and the like therein. The input device 104 is a keyboard and a mouse and inputs a user operation. The display device 105 includes a cathode ray tube (CRT), a liquid crystal display screen, or the like, and displays an image and numerical data generated by the CPU 101 under the control by the CPU 101.

Figure 4:
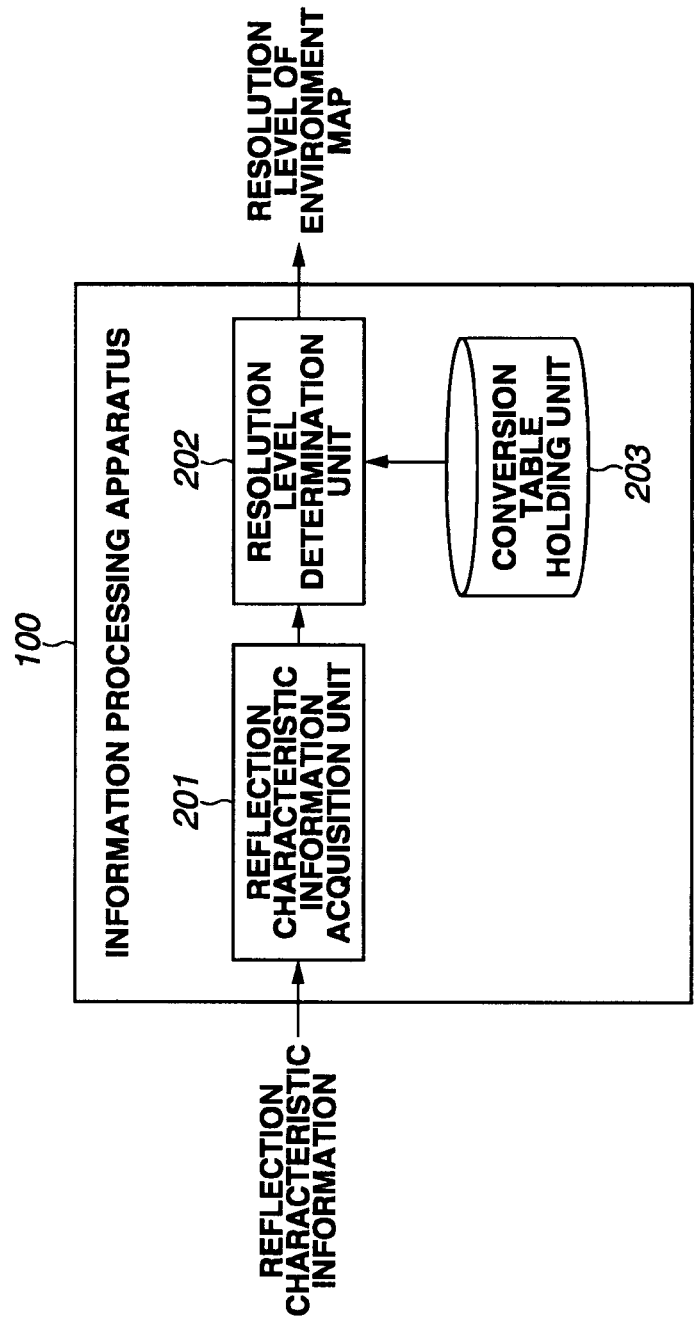
FIG. 4 is a diagram illustrating a functional configuration example of t the information processing apparatus according to the first exemplary embodiment.

FIG. 4 illustrates an example of a functional configuration of the information processing apparatus 100 according to the first exemplary embodiment.

The CPU 101 executes the program stored in the main memory 102, or the like, to cause the information processing apparatus 100 to function as a reflection characteristic information acquisition unit 201 and a resolution level determination unit 202. The storage device 103 stores therein a conversion table holding unit 203 which holds a conversion table for conversion of reflection characteristic information into a resolution level of the environment map.

The reflection characteristic information acquisition unit 201 acquires reflection characteristic information of an object targeted for the rendering. In the present exemplary embodiment, the reflection characteristic information acquisition unit 201 acquires specular reflection width information among various pieces of reflection characteristic information. The specular reflection width information is an example of specular reflection information.

The resolution level determination unit 202 determines a resolution level of the environment map based on the reflection characteristic information acquired by the reflection characteristic information acquisition unit 201. In the present exemplary embodiment, the resolution level determination unit 202 reads out the conversion table from the conversion table holding unit 203 and determines a resolution level of the environment map based on the specular reflection width information using the conversion table. The determined resolution level of the environment map is provided to another system that performs the rendering. The environment map is an example of illumination information to be used in the rendering.

(Description of Processing According to First Exemplary Embodiment)

Figure 5A:
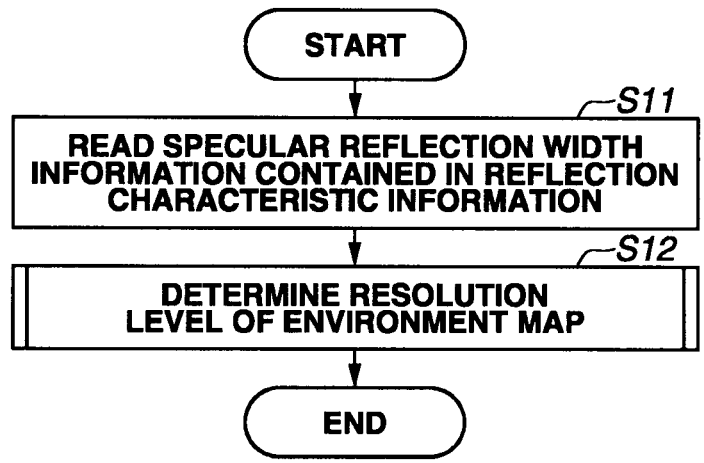
FIGS. 5A and 5B are flowcharts each illustrating a processing procedure performed by the information processing apparatus according to the first exemplary embodiment.
Figure 5B:
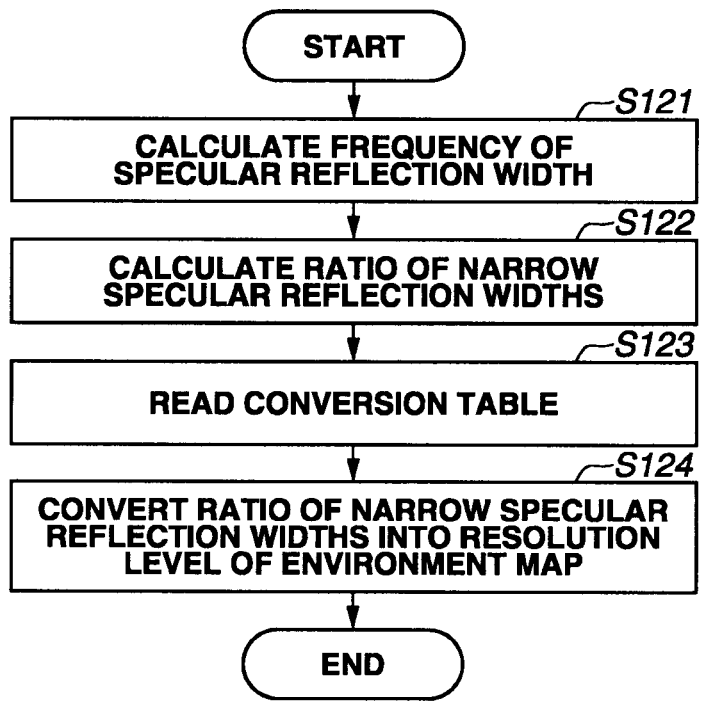

Next, main processing performed by the information processing apparatus 100 according to the present exemplary embodiment will be described with reference to flowcharts illustrated in FIGS. 5A and 5B. The processing procedures illustrated in the flowcharts are realized by the CPU 101 executing the program stored in the main memory 102 or the like.

First, in step S11, the reflection characteristic information acquisition unit 201 reads the reflection characteristic information stored in the storage device 103 into the main memory 102. While, in the present exemplary embodiment, the reflection characteristic information is acquired from the storage device 103, the information processing apparatus 100 can be configured to acquire the information from an external apparatus or the like.

Figure 6A:
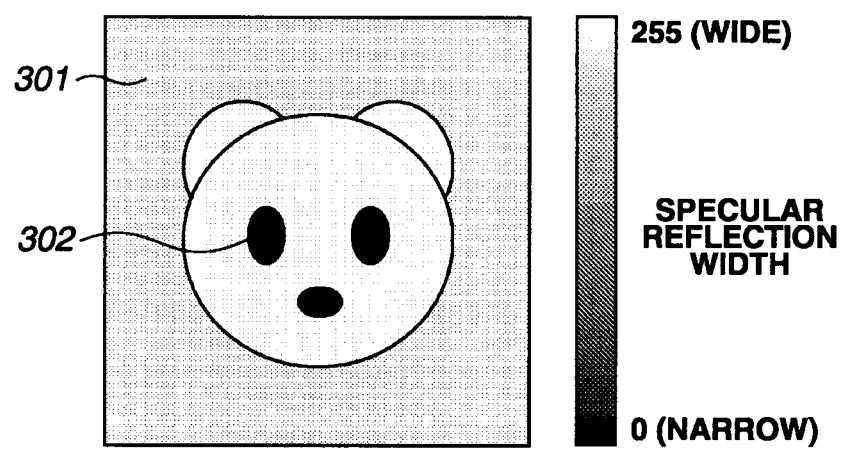
FIGS. 6A and 6B are diagrams illustrating specular reflection width information.

In the present exemplary embodiment, the specular reflection width information is read in a map format (hereinafter referred to as a specular reflection width map) as the reflection characteristic information and is used in subsequent steps. In the present exemplary embodiment, the specular reflection width map has a size of 128×128 pixels and a resolution of 150 dpi. Further, the specular reflection width map is in an 8-bit gray image format and stores therein specular reflection widths, each in association with a different pixel, at respective positions of the pixels. FIG. 6A illustrates an example of the specular reflection width map.

Figure 6B:
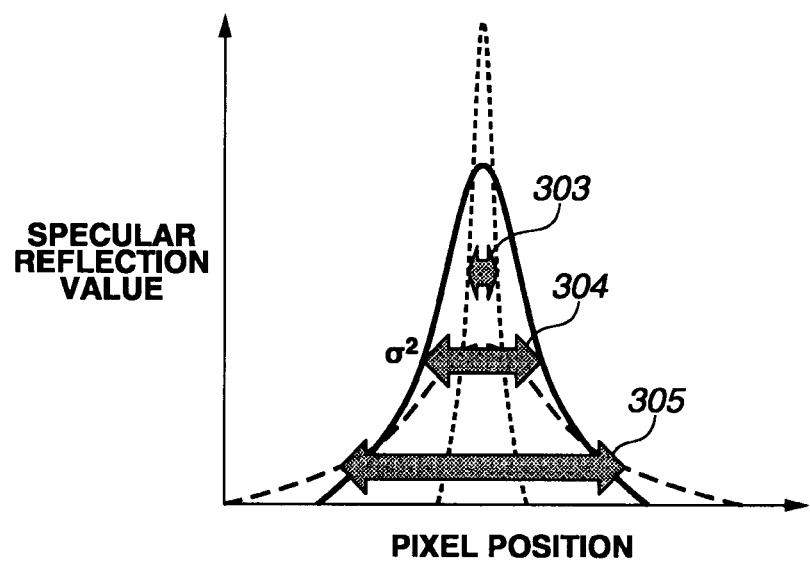

In the example illustrated in FIG. 6A, a region 301 indicates a region having a wide specular reflection width, and a region 302 indicates a region having a narrow specular reflection width. The stored specular reflection width is a value of a variance $\sigma^2$ obtained when Gaussian approximation is applied to specular reflection values. FIG. 6B illustrates a distribution example of specular reflection values. As illustrated in FIG. 6B, compared to a specular reflection width in a case of a standard example (a width 304 in FIG. 6B), the value of the variance $\sigma^2$ reduces/decreases in a case of the specular reflection width having a narrow width (a width 303 in FIG. 6B) and, conversely, the value of the variance $\sigma^2$ increases in a case of the specular reflection width having a broad width (a width 305 in FIG. 6B).

In step S12, the resolution level determination unit 202 determines the resolution level of the environment map. The detailed processing in the present step will be described with reference to FIG. 5B.

Figure 7A:
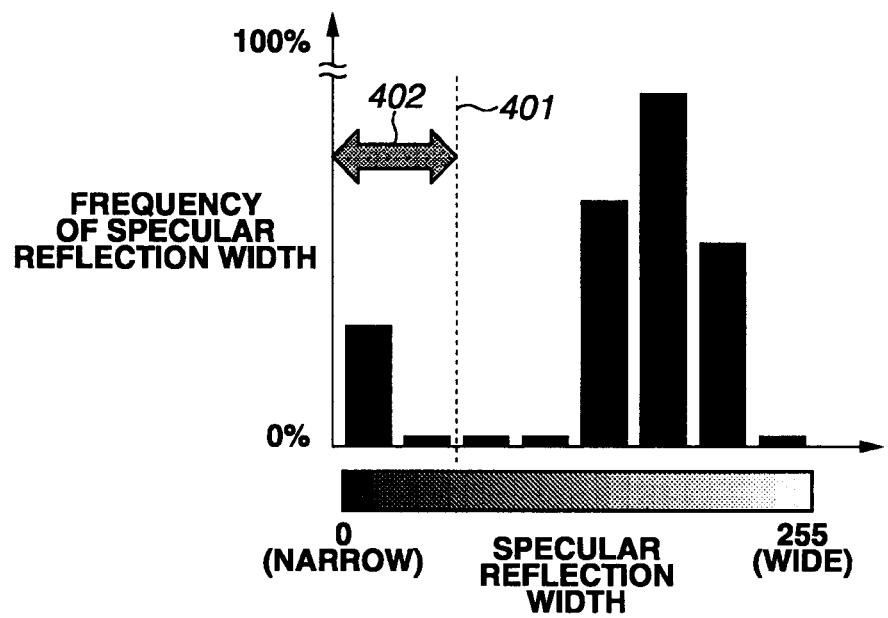
FIGS. 7A and 7B are diagrams illustrating a method for determining a resolution level of an environment map.

In step S121, the resolution level determination unit 202 calculates a frequency of the specular reflection width. More specifically, for each range of the specular reflection width, the resolution level determination unit 202 counts the number of pixels in the range. FIG. 7A illustrates the frequencies of the specular reflection widths in the specular reflection width map illustrated in FIG. 6A. The number of bins and the bin width specified in advance are used to calculate the frequencies of the specular reflection widths. In the example illustrated in FIG. 7A, the frequencies are calculated with the number of bins set to eight and the bin width set to 32 with respect to the specular reflection widths expressed by values of 0 to 255 and are normalized in such a manner that the sum of the frequencies becomes 100%.

Next, in step S122, the resolution level determination unit 202 calculates a ratio of narrow specular reflection widths based on the frequencies of the specular reflection widths calculated in step S121. This will be described now with reference to FIG. 7A as an example. The ratio of narrow specular reflection widths is calculated based on a total frequency from a bin including the minimum value of the specular reflection width to a bin including a threshold value 401, which is used to identify the ratio of narrow specular reflection widths specified in advance, in the frequencies of the reflection specular widths. In other words, the resolution level determination unit 202 calculates a ratio of pixels having the specular reflection width equal to or narrower than the threshold value 401 to all the pixels forming the specular reflection width map. The ratio of narrow specular reflection widths corresponds to a ratio of a region in which the specular reflection width is equal to or narrower than the threshold value 401 to the entire region in the specular reflection width map. In the example illustrated in FIG. 7A, the ratio of narrow specular reflection widths corresponds to the total frequency within the range of a width 402. In the example illustrated in FIG. 7A, the threshold value 401 is set at 25% of the specular reflection widths, and the ratio of narrow specular reflection widths is 20%.

Figure 7B:
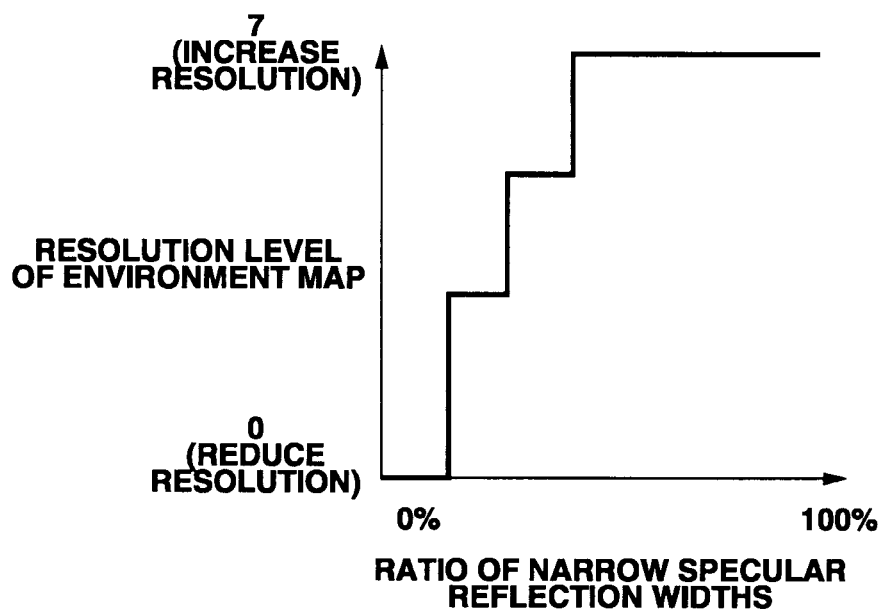

Next, in step S123, the resolution level determination unit 202 reads the conversion table held in the conversion table holding unit 203 in advance. FIG. 7B illustrates an example in which the conversion table is graphically indicated. In the present exemplary embodiment, the conversion table is a table to be used for conversion of the ratio of narrow specular reflection widths to the resolution level of the environment map. The conversion table has such a tendency that the resolution of the environment map increases as the ratio of narrow specular reflection widths increases, and the resolution of the environment map reduces/decreases as the ratio of narrow specular reflection widths reduces/decreases. While, the resolution level of the environment map is expressed by eight-bit binary data (0 to 7), the bit depth and the format type are not limited thereto as long as the resolution level serves as a parameter for specifying the resolution conversion.

In step S124, the resolution level determination unit 202 converts the ratio of narrow specular reflection widths calculated in step S122 into the resolution level of the environment map using the conversion table acquired in step S123. The resolution level determination unit 202 performs processing to increase the resolution level in a case where the ratio of narrow specular reflection widths is high and to reduce/decrease the resolution level in a case where the ratio of narrow specular reflection widths is low, by using the conversion table. After that, the processing in step S12 is ended.

After the processing in step S12 is ended, the CPU 101 outputs the determined resolution level of the environment map to another system that performs rendering. After that, the series of processing procedures in the flowchart illustrated in FIG. 5A is ended.

While, in the present exemplary embodiment, the specular reflection width information is used as the specular reflection information, specular reflection intensity information can be used, as described in the description about the reflection characteristics. Usable examples further include a scalar value of the specular reflection width, a scalar value of the specular reflection intensity, a specular map, a gloss map, a roughness map, and data storing a physically-based parameter of the specular reflection component represented by the Cook-Torrance model. The data size, the resolution, the bit depth, and the format type of the specular reflection width map are also not limited to the above-described contents.

While, in step S12, the resolution level determination unit 202 determines the resolution level of the environment map based on the ratio of narrow specular reflection widths, the processing for determination of the resolution level is not limited thereto as long as the processing increases the resolution when the specular reflection width is narrow and reduces/decreases the resolution when the specular reflection width is wide. For example, the processing for determination of the resolution level can be processing that identifies the minimum value of the specular reflection width from the specular reflection width map and determines the resolution level based on the minimum value.

The specular reflection intensity information can be used in step S12. In this case, the resolution level determination unit 202 reads the specular reflection intensity information in a map format (hereinafter referred to as a specular reflection intensity map). The specular reflection intensity map stores therein the specular reflection intensity at each pixel position in association with each pixel. In the example illustrated in FIG. 6B, the stored specular reflection intensity is the peak value of the specular reflection value. The processing for determination of the resolution level can be processing in which the resolution level determination unit 202 identifies the maximum value of the specular reflection intensity from the specular reflection intensity map and determines the resolution level based on the maximum value. Further, the processing for determination of the resolution level can be processing that increases the resolution when the specular reflection intensity is high and reduces/decreases the resolution when the specular reflection intensity is low.

The resolution level determination unit 202 can also determine whether the resolution can be converted based on the ratio of narrow specular reflection widths. More specifically, the resolution level determination unit 202 permits a reduction in the resolution when the ratio of narrow specular reflection widths is low and does not permit a reduction in the resolution when the ratio of narrow specular reflection widths is high. In this case, the CPU 101 outputs information indicating whether the resolution of the environment map can be converted, to another system that carries out the rendering.

(Description of Beneficial Effects Achieved by First Exemplary Embodiment)

Beneficial effects achieved by the present exemplary embodiment will be described with reference to FIG. 8.

The upper row of FIG. 8 illustrates a rendering result 502 obtained using the environment map at a high resolution and a rendering result 503 obtained using the environment map at a low resolution, with respect to a specular reflection width map 501 including a region where the specular reflection width is narrow. The lower row of FIG. 8 illustrates a rendering result 505 obtained using the environment map at a high resolution and a obtained using the environment map at a low resolution, with respect to a specular reflection width map 504 in which the specular reflection width is wide overall. The rendering result 502 and the rendering result 506 are acquired by employing the present exemplary embodiment.

In the rendering result 502, the texture appearance can be correctly reproduced without blurring in the reflection of the environment map in a region 502*a* where the specular reflection width is narrow. On the other hand, in the rendering result 503, blurring occurs in the reflection of the environment map in a region 503*a* where the specular reflection width is narrow, which deteriorates the reproduction quality of the texture appearance. The information processing apparatus 100 according to the present exemplary embodiment determines that the environment map at a high resolution is applied for the specular reflection width map 501 including a region where the specular reflection width is narrow. Thus, no deterioration occurs in the reproduction quality of the texture appearance as indicated by the rendering result 502.

In the rendering result 505, the reflection of the environment map is reproduced in a blurred state in a region 505*a* where the specular reflection width is wide, and this can be said to be correct as the reproduction of the texture appearance. On the other hand, in the rendering result 506, the reflection of the environment map is also reproduced in a blurred state in a region 506*a* where the specular reflection width is wide, and thus a difference between the rendering result 506 and the rendering result 505 is not significant. Thus, the information processing apparatus 100 according to the present exemplary embodiment determines that the environment map at a low resolution is sufficient for the specular reflection width map 504 in which the specular reflection width is wide overall. Accordingly, the information processing apparatus 100 can reduce the data amount of the environment map while deterioration in the reproduction quality of the texture appearance is prevented or reduced as indicated by the rendering result 506.

In the above-described manner, according to the present exemplary embodiment, when the rendering is performed, it is possible to reduce the data amount of the environment map while the deterioration in the texture appearance reproduction is prevented or reduced.

The first exemplary embodiment has been described using the example in which the disclosure is applied to a single information processing apparatus. A second exemplary embodiment will be described using an example in which the disclosure is applied to an information processing system including a server apparatus, which performs the rendering, and a client apparatus, which acquires the environment map and displays the rendering result. In the following description, the second exemplary embodiment will be described focusing on differences from the first exemplary embodiment.

(Configuration of Information Processing System According to Second Exemplary Embodiment)

Figure 9:
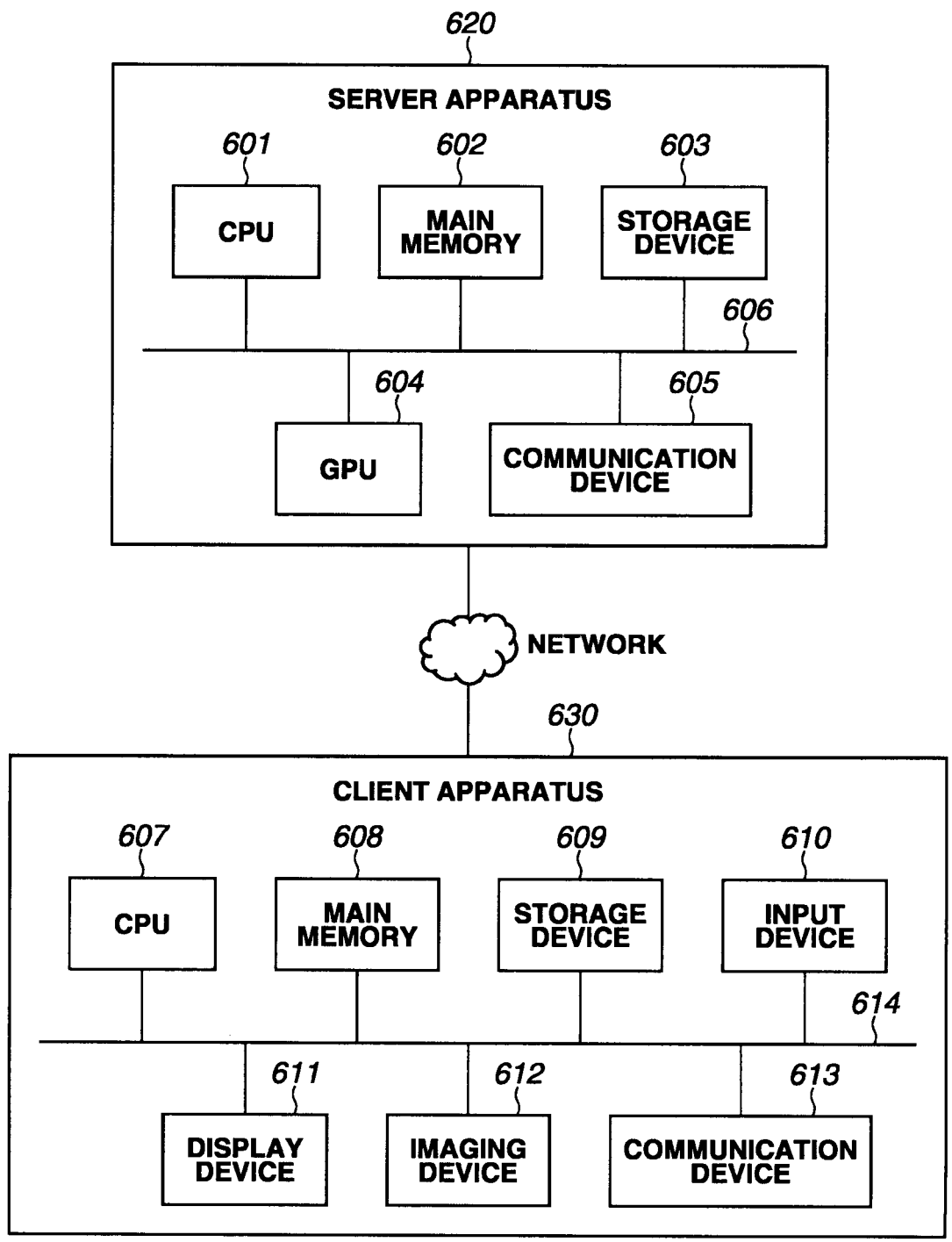
FIG. 9 is a diagram illustrating an example of the hardware configuration of an information processing system according to a second exemplary embodiment.

FIG. 9 illustrates an example of the hardware configuration of an information processing system according to the present exemplary embodiment. The information processing system includes a server apparatus 620 and a client apparatus 630. The server apparatus 620 and the client apparatus 630 are connected to each other via a network.

The server apparatus 620 includes a CPU 601, a main memory 602, a storage device 603, a graphics processing unit (GPU) 604, and a communication device 605. Each of these units is connected to each other via a bus 606. The CPU 601 is in charge of control of the entire server apparatus 620. The CPU 601 executes a program stored in the main memory 602 or the like, to realize processing on the server apparatus 620 among processing procedures illustrated in a sequence diagram and flowcharts that will be described below. The main memory 602 stores therein various kinds of programs, data, and the like for the processing. The storage device 603 is a hard disk, and stores various kinds of programs, data, and the like therein. The GPU 604 performs arithmetic processing dedicated to image processing and rendering processing under the control by the CPU 601. The communication device 605 is a device that connects to various kinds of networks. The CPU 601 performs data communication with an external apparatus including the client apparatus 630 via the communication device 605.

The client apparatus 630 includes a CPU 607, a main memory 608, a storage device 609, an input device 610, a display device 611, an imaging device 612, and a communication device 613. Each of these units is connected to each other via a bus 614. The CPU 607, the main memory 608, and the storage device 609 can be realized by similar configurations to the above-described CPU 601, main memory 602 and storage device 603 of the server apparatus 620, and thus the redundant descriptions will be omitted. The input device 610 is a keyboard, a mouse, and a touch panel, and inputs a user operation. The display device 611 includes a CRT, a liquid crystal display screen, or the like, and displays an image and a graphical user interface (GUI) received from the server apparatus 620 under the control by the CPU 607. The imaging device 612 is a device for acquiring surrounding illumination information as the environment map, and a camera supporting a wide angle of view, such as an omnidirectional camera and a fisheye-lens camera, is used as the imaging device 612. The communication device 613 is a device that connects to various kinds of networks. The CPU 607 performs data communication with an external apparatus including the server apparatus 620 via the communication device 613.

Figure 10:
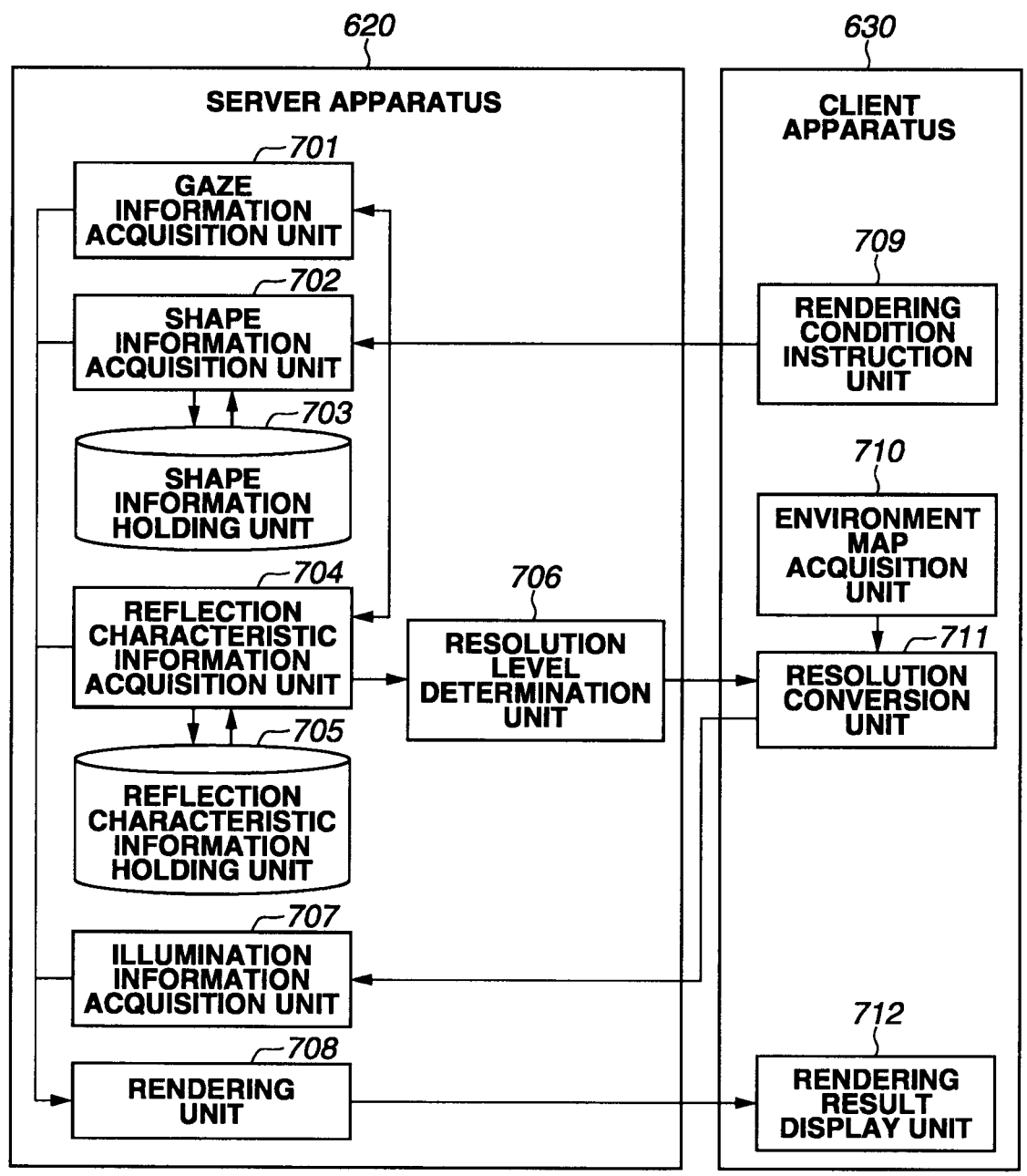
FIG. 10 is a diagram illustrating an example of the functional configuration of the information processing system according to the second exemplary embodiment.

FIG. 10 illustrates an example of the functional configuration of the information processing system according to the present exemplary embodiment.

The server apparatus 620 has functions of a gaze information acquisition unit 701, a shape information acquisition unit 702, a reflection characteristic information acquisition unit 704, a resolution level determination unit 706, an illumination information acquisition unit 707, and a rendering unit 708. The CPU 601 executes the program stored in the main memory 602 or the like, to cause the server apparatus 620 to function as each of these functional units. The storage device 603 stores therein a shape information holding unit 703, which holds shape information as a database, and a reflection characteristic information holding unit 705, which holds reflection characteristic information as a database.

The client apparatus 630 has functions of a rendering condition instruction unit 709, an environment map acquisition unit 710, a resolution conversion unit 711, and a rendering result display unit 712. The CPU 607 executes the program stored in the main memory 608 or the like, to cause the client apparatus 630 to function as each of these functional units.

The gaze information acquisition unit 701 acquires gaze information contained in rendering condition instruction information received from the client apparatus The shape information acquisition unit 702 acquires the shape information from the shape information holding unit 703, based on instruction information indicating the shape information contained in the rendering condition instruction information received from the client apparatus 630.

The shape information holding unit 703 reads the shape information from the database, according to an instruction from the shape information acquisition unit 702.

The reflection characteristic information acquisition unit 704 acquires the reflection characteristic information from the reflection characteristic information holding unit 705, based on information specifying the reflection characteristic information contained in the rendering condition instruction information received from the client apparatus 630.

The reflection characteristic information holding unit 705 reads the reflection characteristic information from the database, according to an instruction from the reflection characteristic information acquisition unit 704.

The resolution level determination unit 706 determines a resolution level of an environment map, based on the acquired reflection characteristic information. The method for determination of the resolution level of the environment map is similar to the first exemplary embodiment, and thus the redundant description will be omitted. The resolution level determination unit 706 transmits the determined resolution level to the client apparatus 630. The client apparatus 630 inputs the resolution level received from the server apparatus 620 to the resolution conversion unit 711.

The illumination information acquisition unit 707 acquires the environment map, which has been subjected to the resolution conversion and received from the client apparatus 630, as the illumination information.

The rendering unit 708 performs the rendering processing based on the acquired gaze information, shape information, reflection characteristic information, and illumination information, and transmits the rendering result to the client apparatus 630. The client apparatus 630 inputs the rendering result received from the server apparatus 620 to the rendering result display unit 712.

The rendering condition instruction unit 709 transmits the rendering condition instruction information generated using application software that specifies the rendering conditions and displays the rendering result according to a user's operation to the server apparatus 620. The rendering condition instruction information includes rendering conditions regarding the gaze information, the shape information, and the reflection characteristic information. The server apparatus 620 inputs the rendering condition instruction information received from the client apparatus 630 to each of the gaze information acquisition unit 701, the shape information acquisition unit 702, and the reflection characteristic information acquisition unit 704.

The environment map acquisition unit 710 acquires the environment map to be used in the rendering from the imaging device 612.

The resolution conversion unit 711 converts the resolution of the environment map acquired by the environment map acquisition unit 710, based on the resolution level received from the server apparatus 620, and transmits the environment map obtained by the resolution conversion to the server apparatus 620. The server apparatus 620 inputs the environment map received from the client apparatus 630 to the illumination information acquisition unit 707.

The rendering result display unit 712 displays the rendering result received from the server apparatus 620 on the display device 611.

(Description of Processing According to Second Exemplary Embodiment)

FIG. 11 is a sequence diagram illustrating processing that is performed by the information processing system according to the present exemplary embodiment. FIG. 11 illustrates the overview of the processing, and the details of processing in each step that is performed by the server apparatus 620 and the client apparatus 630 will be described below with reference to the flowcharts.

First, in step S201, the client apparatus 630 sends a rendering request to the server apparatus 620.

Next, in step S202, the server apparatus 620 transmits acceptance information indicating that the rendering request is accepted to the client apparatus 630.

Next, in step S203, the client apparatus 630 transmits the rendering condition instruction information to the server apparatus 620.

Next, in step S204, the server apparatus 620 reads the shape information stored in the shape information holding unit 703, based on the instruction information indicating the shape information contained in the rendering condition instruction information received in step S203.

Next, in step S205, the server apparatus 620 reads the reflection characteristic information stored in the reflection characteristic information holding unit 705, based on the instruction information indicating the reflection characteristic information contained in the rendering condition instruction information received in step S203.

Next, in step S206, the server apparatus 620 determines the resolution level of the environment map, based on the specular reflection width map in the reflection characteristic information read in step S205.

While steps S204 to S206 are performed, in step S207, the client apparatus 630 acquires the environment map. The environment map is acquired by the imaging device 612, which is a part of the client apparatus 630. The information processing system can be configured in such a manner that the client apparatus 630 acquires the environment map from an external camera.

Next, in step S208, the server apparatus 620 notifies the client apparatus 630 of the resolution level determined in step S206.

Next, in step S209, the client apparatus 630 converts the resolution of the environment map acquired in step S207, based on the resolution level received from the server apparatus 620.

Next, in step S210, the client apparatus 630 transmits the environment map having the converted resolution in step S209 to the server apparatus 620.

Next, in step S211, the server apparatus 620 performs the rendering based on the gaze information contained in the rendering condition instruction information received in step S203, the shape information read in step S204, the reflection characteristic information read in step S205, and the environment map received in step S210.

Next, in step S212, the server apparatus 620 transmits the result of the rendering in step S211 to the client apparatus 630.

Lastly, in step S213, the client apparatus 630 displays the rendering result received from the server apparatus 620 on the display device 611, which is a part of the client apparatus 630.

In the above-described manner, the series of processing procedures illustrated in the sequence diagram of FIG. 11 is ended.

Figure 12A:
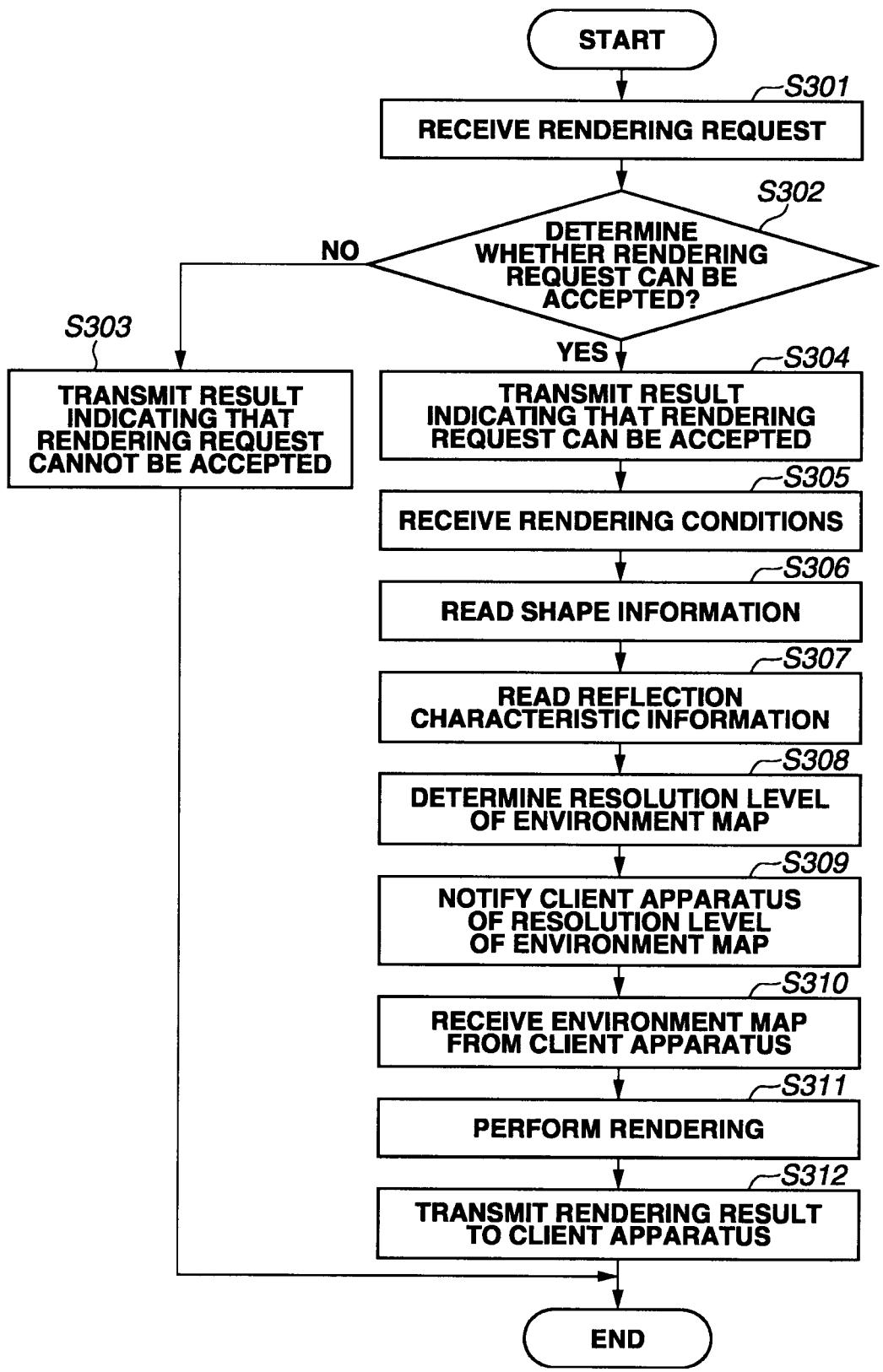
FIG. 12A is a flowchart illustrating processing a procedure that is performed by a server apparatus.

FIG. 12A is a flowchart illustrating the details of the processing performed by the server apparatus 620 according to the present exemplary embodiment. The processing illustrated in the flowchart is realized by the CPU 601 executing the program stored in the main memory 602 or the like. The CPU 601 transmits and receives data between the server apparatus 620 and the client apparatus 630 using the communication device 605.

In step S301, the CPU 601 receives a signal of the rendering request from the client apparatus 630.

In step S302, the CPU 601 determines whether the rendering request can be accepted. In the present exemplary embodiment, determination of whether the number of rendering operations currently in process exceeds a predetermined number of simultaneous rendering operations is used as a criterion. In a case where the CPU 601 determines that the rendering request can be accepted (YES in step S302), the processing in step S304 and steps subsequent thereto is performed. In a case where the CPU 601 determines that the rendering request cannot be accepted (NO in step S302), the processing in step S303 is performed. Alternatively, a different criterion can be used as the determination criterion.

In step S303, the CPU 601 transmits a signal indicating that the rendering request cannot be accepted, to the client apparatus 630. After that, the series of processing procedures in the flowchart is ended.

In step S304, the CPU 601 transmits a signal indicating that the rendering request can be accepted, to the client apparatus 630.

Figure 13:
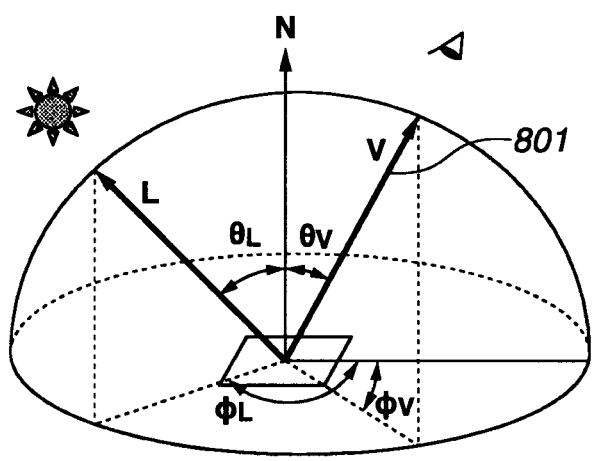
FIG. 13 is a diagram illustrating gaze information.

In step S305, the CPU 601 receives the rendering condition instruction information from the client apparatus 630. The gaze information contained in the rendering condition instruction information is information indicating the position and the distance of when the object, as the rendering target, is observed in the rendering. FIG. 13 illustrates the gaze information. In the present exemplary embodiment, a gaze vector 801 is used as the gaze information as illustrated in FIG. 13. In the example illustrated in FIG. 13, the gaze vector 801 is expressed as V(θv, φv). The shape information specified by the rendering condition instruction information is information specifying the three-dimensional shape of the object. The shape information specified in the present exemplary embodiment is a plate-like shape having an even normal vector N. The reflection characteristic information specified by the rendering condition instruction information is information specifying the diffuse reflection characteristic and the specular reflection characteristic. The reflection characteristic information includes three pieces of information, a diffuse reflected light map, a normal map, and a specular reflection width map as a set, in the present exemplary embodiment. The reflection characteristic information specified in the present exemplary embodiment includes a diffuse reflected light map having even diffuse reflected light, a normal map having the even normal vector N, and a specular reflection width map containing a region where the specular reflection width is narrow as a part thereof. The specular reflection width map is the same as the specular reflection width map illustrated in FIG. 6A according to the first exemplary embodiment.

In step S306, the CPU 601 reads the shape information stored in the shape information holding unit 703, based on the instruction information indicating the shape information contained in the rendering condition instruction information received in step S305.

In step S307, the CPU 601 reads the reflection characteristic information stored in the reflection characteristic information holding unit 705, based on the instruction information indicating the reflection characteristic information contained in the rendering condition instruction information received in step S305.

In step S308, the CPU 601 determines the resolution level of the environment map, based on the specular reflection width map included in the reflection characteristic information read in step S307. In the present exemplary embodiment, the resolution level is expressed by eight-bit binary data (0 to 7) similarly to the first exemplary embodiment.

In step S309, the CPU 601 notifies the client apparatus 630 of the resolution level determined in step S308.

In step S310, the CPU 601 receives the environment map from the client apparatus 630. In the present exemplary embodiment, the environment map is a Latitude-Longitude type (or also called a Cylindrical type) having axes set on the polar angle and the azimuthal angle at the time of the measurement and is received as one image in the Red-Green-Blue (RGB) image format.

Figure 14A:
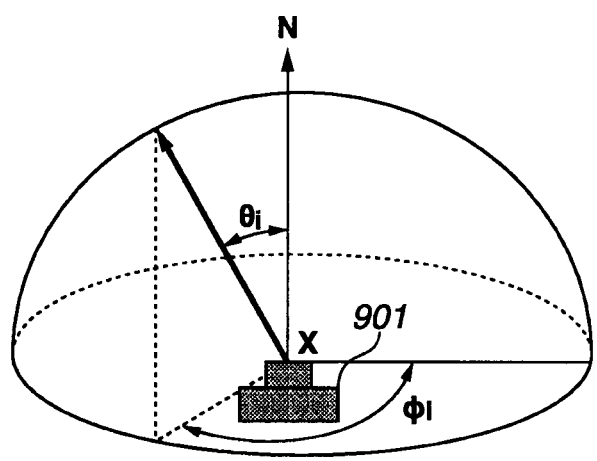
FIGS. 14A and 14B are diagrams illustrating the environment map.
Figure 14B:
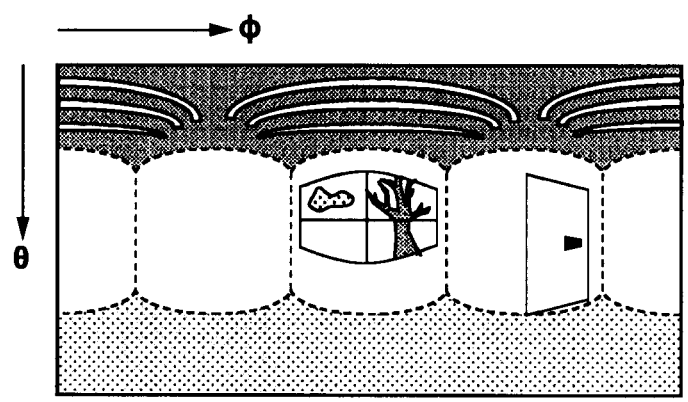

Next, the details of the environment map will be described with reference to FIGS. 14A and 14B. FIG. 14A illustrates an example of the configuration of a measurement device used when the environment map is acquired. FIG. 14B illustrates an example of the generated environment map. In the measurement device illustrated in FIG. 14A, the environment map can be acquired by an omnidirectional camera 901 (corresponding to the imaging device 612) set at an arbitrary point X. More specifically, the environment map is generated by measuring a light intensity from the arbitrary point X in a gaze direction (θi, φi) and storing the measured intensity for each gaze direction (θi, φi). Regarding (θi, φi) in FIG. 14B, θ and φ indicate a polar angle with respect to a surface normal N and an azimuthal angle with respect to a reference direction, respectively, with an origin placed at the point X of an object located at the position of the omnidirectional camera 901. Further, i indicates the number at the time of the measurement when the light intensity is measured for each Δθ and Δφ, and i in the environment map corresponds to pixels in the ascending order from the upper left pixel set as 0.

In step S311, the CPU 601 performs the rendering processing based on the gaze information, the shape information, the reflection characteristic information, and the environment map acquired in the above-described respective steps. The detailed description of the rendering processing will be omitted herein. The rendering result indicates an appearance when the object having the specified shape information and reflection characteristic information is illuminated with the environment map and is observed from the direction indicated by the specified gaze information. In the present exemplary embodiment, the rendering result is generated in the RGB image format.

In step S312, the CPU 601 transmits the rendering result acquired in step S311 to the client apparatus 630.

In this manner, the series of processing procedures in the flowchart illustrated in FIG. 12A is ended.

While, in step S305, the gaze information is expressed as the gaze vector V(θv, φv), the gaze information is not limited thereto. The gaze information can be any information that defines the gaze information to be used in the rendering processing, and the format type of the gaze information is not limited. Further, the gaze information can include gaze distance information and/or field-of-view information.

While, in step S305, the present flowchart has been described using the case in which the reflection characteristic information includes the three pieces of information, i.e., the diffuse reflected light map, the normal map, and the specular reflection width map, as a set, the reflection characteristic information is not limited thereto. The reflection characteristic information can be any information containing information that defines the reflection characteristic information to be used in the rendering processing, and the information type and the format type thereof are not limited.

While, in step S310, the present flowchart has been described using the case in which the environment map is the Latitude-Longitude type having the axes set on the polar angle and the azimuthal angle at the time of the measurement, the environment map can be any information storing three-dimensional illumination information therein and is not limited thereto. More specifically, the environment map can be any environment map in which omnidirectional illumination information is converted into a two-dimensional image format as represented by the Latitude-Longitude type, the Cube type, and the Sphere type. Even information in which the layout and the direction of the illumination are specified in a three-dimensional space can also be employed because such information can also be converted into an environment map like the above-described example by performing baking processing generally used in the rendering technique.

While the present flowchart has been described using the case in which the environment map received in step S310 and the rendering result generated in step S311 are information in the RGB image format, the environment map and the rendering result are not limited thereto. For example, in a case where the environment map is in a gray image format, a rendering result of the environmental map contains almost no RGB information, and thus either of the RGB image format and the gray image format can be used. In a case where the environment map is omnidirectional video information, the CPU 601 can perform the rendering processing for each video frame in the environment map and generate the rendering result in a video format in step S311.

Figure 12B:
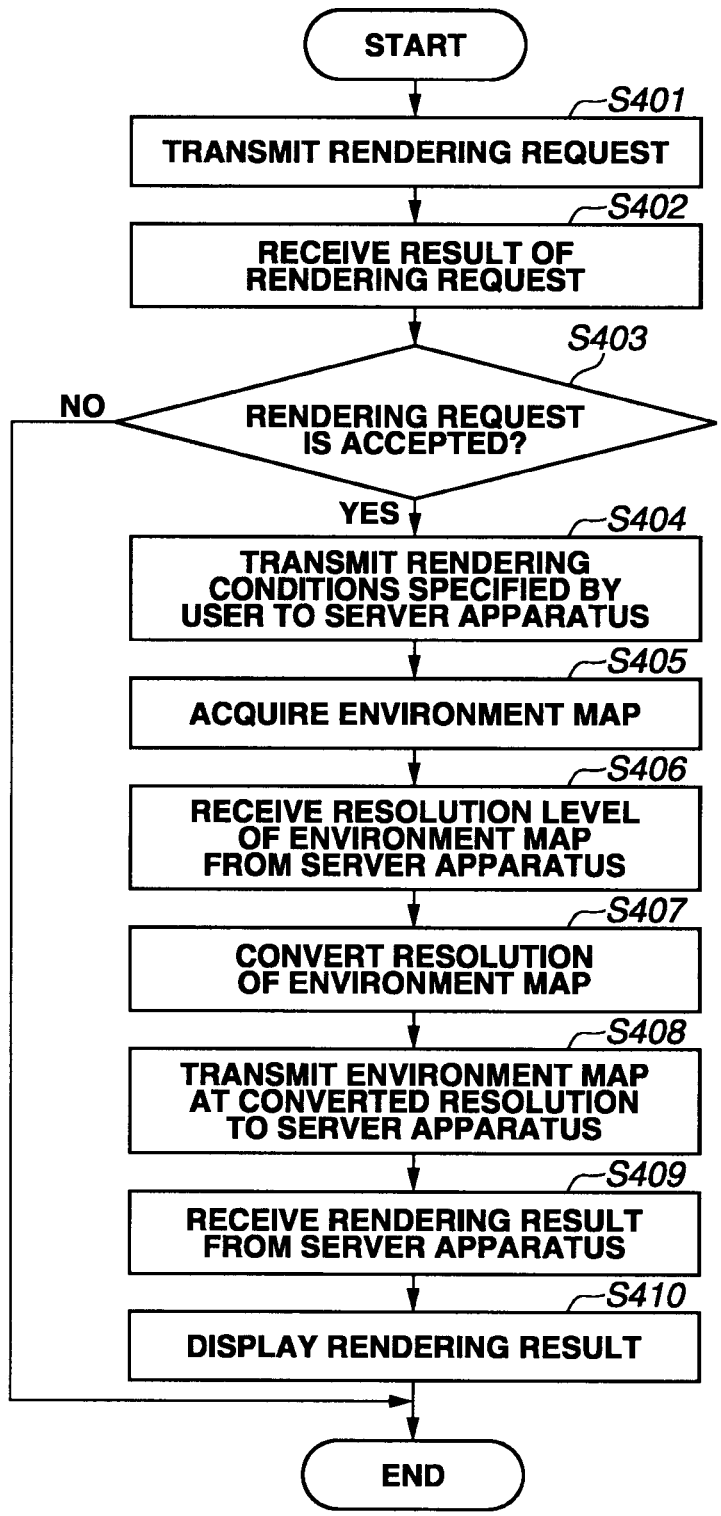
FIG. 12B is a flowchart illustrating processing procedure that is performed by a client apparatus, according to the second exemplary embodiment, respectively.

FIG. 12B is a flowchart illustrating the details of the processing performed by the client apparatus 630 according to the present exemplary embodiment. The processing illustrated in the present flowchart is realized by the CPU 607 executing the program stored in the main memory 608 or the like. The CPU 607 controls data transmission and reception between the client apparatus 630 and the server apparatus 620 using the communication device 613.

In step S401, the CPU 607 transmits a signal of a rendering request to the server apparatus 620.

In step S402, the CPU 607 receives a result of the rendering request from the server apparatus 620.

In step S403, the CPU 607 determines whether the result of the rendering request received in step S402 indicates acceptance. In a case where the CPU 607 determines that the result of the rendering request indicates acceptance of the rendering request (YES in step S403), the processing in step S404 and steps subsequent thereto is performed. In a case where the CPU 601 determines that the result of the rendering request indicates unacceptance of the rendering request (NO in step S403), the series of processing procedures in the flowchart is ended.

In step S404, the CPU 607 transmits the rendering condition instruction information specified by the user to the server apparatus 620. The user specifies the rendering conditions using the GUI provided by the application software that displays the rendering result. More specifically, as for the shape information and the reflection characteristic information, lists of pieces of information saved in advance in the shape information holding unit 703 and the reflection characteristic information holding unit 705 in the server apparatus 620 are presented to the user, and the user specifies the shape information and the reflection characteristic information by selecting them from these lists. As for the gaze information, the user specifies the direction in which the object is observed by specifying the direction on the touch panel.

In step S405, the CPU 607 acquires the environment map by the imaging device 612.

The method for acquiring the environment map is as described in the above-described step S310.

In step S406, the CPU 607 receives the resolution level of the environment map from the server apparatus 620.

Figure 15:
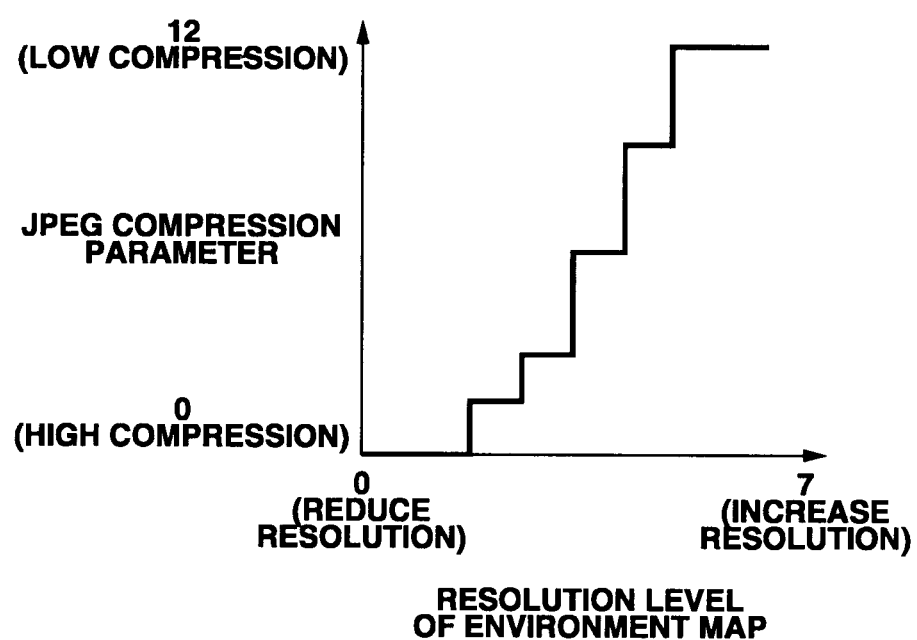
FIG. 15 is a diagram illustrating a conversion method for a Joint Photographic Experts Group (JPEG) compression parameter.

In step S407, the CPU 607 performs processing for converting the resolution of the environment map acquired in step S405, based on the resolution level received in step S406. In the present exemplary embodiment, a Joint Photographic Experts Group (JPEG) compression method is used in the processing for converting the resolution. More specifically, the resolution level expressed by eight-bit binary data (0 to 7) is converted into a JPEG compression parameter using a conversion table saved in advance. FIG. 15 illustrates an example in which the conversion table is graphically indicated. In the present exemplary embodiment, the conversion table is a table for conversion of the resolution level into the JPEG compression parameter. The conversion table has such a tendency that a low compression is applied as the resolution level increases and a high compression is applied as the resolution level reduces/decreases. The CPU 607 performs a JPEG compression using the converted JPEG compression parameter. The details of the JPEG compression method are a known technique, and thus the redundant description will be omitted.

In step S408, the CPU 607 transmits the environment map having the resolution converted in step S407 to the server apparatus 620.

In step S409, the CPU 607 receives the rendering result from the server apparatus 620.

In step S410, the CPU 607 displays the rendering result received in step S409 on the display device 611, to present the result to the user.

In the above-described manner, the series of processing procedures in the flowchart illustrated in FIG. 12B is ended.

While, in step S404, the method has been described using the case in which the rendering conditions are specified by the user, the method for specifying the rendering conditions is not limited thereto. The rendering condition instruction information is not limited to the above-described example as long as it contains information specifying the reflection characteristic information, and the other rendering conditions can be specified on the server side. The rendering conditions can be automatically specified by the application software. The rendering conditions can also be automatically specified by the imaging device 612 of the client apparatus 630 or based on an output value from a gyroscope sensor. The GUI provided by the application software is also not limited to the above-described example.

While the CPU 607 captures an image to generate the environment map using the imaging device 612 in step S405 and converts the resolution of the environment map in step S407, the acquisition of the environment map is not limited thereto.

For example, the environment map can be acquired by a method in which a database of the environment map is held in, for example, the main memory 608 of the client apparatus 630 in advance, and the CPU 607 acquires the environment map from the database in accordance with the specified environment map type and the resolution thereof.

While, in step S407, the CPU 607 starts converting the resolution of the environment map regardless of the resolution level of the environment map, the CPU 607 can perform determination of whether the resolution can be converted and start converting the resolution according to a result of the determination. For example, in a case where the resolution level of the environment map is a level indicating the highest resolution, the CPU 607 can directly transmit the environment map acquired in step S405 to the server apparatus 620 without converting the resolution.

While, in step S407, the JPEG compression method is used to convert the resolution of the environment map, the conversion of the resolution of the environment map is not limited thereto. Because the conversion of the resolution of the environment map is intended to reduce the data amount of the environment map by removing a high-frequency component in the environment map, a different method can be used as long as the intended purpose is fulfilled. For example, the conversion of the resolution of the environment map can be processing that reduces the image size of the environment map, processing that reduces high-frequency information in the environment map, or processing that performs image compression processing using the resolution conversion. While, in the present exemplary embodiment, the JPEG compression parameter for the resolution conversion is determined on the client side, the JPEG compression parameter can be determined on the server side. In this case, in step S308, the server apparatus 620 determines the JPEG compression parameter based on the resolution level and notifies the client apparatus 630 of the JPEG compression parameter.

While the present exemplary embodiment has been described using the case in which the present exemplary embodiment is applied to a server-client system, the apparatus configuration to which the present exemplary embodiment is applicable is not limited thereto. For example, the present exemplary embodiment is also applicable to a system in which an image processing apparatus and a camera apparatus communicates with each other. In a case where an arithmetic unit is not provided on the camera apparatus that acquires the environment map, the image processing apparatus can complement that by specifying the resolution and the image size at the time of the acquisition of the environment map.

The present exemplary embodiment is also applicable to a system in which an image processing apparatus and a database apparatus communicates with each other. In a case where the environment map is stored in the database apparatus for each resolution level of the environment map, the image processing apparatus can acquire the environment map by performing processing that specifies the type of the environment map and the resolution level and reads out the environment map from the database apparatus.

(Description of Beneficial Effects Achieved by Second Exemplary Embodiment)

The present exemplary embodiment achieves beneficial effects similar to the beneficial effects of the first exemplary embodiment. Using the JPEG compression method reduces the data amount to approximately 40% compared to the data amount before the compression in the case of the high-resolution environment map and approximately 10% compared to the data amount before the compression in the case of the low-resolution environment map.

In the above-described manner, according to the present exemplary embodiment, it is possible to reduce the data amount of the environment map while the deterioration in the reproduction of the texture appearance when the rendering is performed can be prevented or reduced.

The disclosure has been described above together with the exemplary embodiments, the above-described exemplary embodiments merely indicate examples of how to embody the disclosure when the disclosure is implemented, and the technical scope of the disclosure shall not be construed limitedly by them. In other words, the aspect of the embodiments can be implemented in various manners without departing from the technical idea thereof or the main features thereof.

As an exemplary modification of each of the above-described exemplary embodiments, the resolution level of the environment map can be determined by generating a learning model that learns the relationship between the specular reflection width information and the resolution level of the environment map, and using the learning model. In this case, the resolution level determination unit 202 determines the resolution level of the environment map by using the learning model trained by machine learning. For example, the information processing apparatus 100 generates the learning model by machine learning with respect to a learning model according to a machine learning algorithm, such as a support vector machine (SVM) algorithm, using a plurality of pairs of input data and teacher data. The specular reflection width map is used as the input data. The resolution level determined to cause not significant deterioration in the reproducibility of the reflection of the environment map is used as the teacher data. The learning model that determines the resolution level of the environment map is generated from the specular reflection width map by training the learning model using these pieces of data. In a case where the learning model is used, the resolution level determination unit 202 determines the resolution level of the environment map using output data acquired by inputting the specular reflection width map into the learning model.

According to the aspect of the embodiments, it is possible to reduce an information amount of illumination information while deterioration in reproduction of a texture appearance when the texture appearance is reproduced using the illumination information can be prevented or reduced. Other Embodiments Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-008800, filed Jan. 24, 2022, which is hereby incorporated by reference herein in its entirety.

What is claimed is:

1. An apparatus comprising:
one or more processors; and
at least one memory coupled to the one or more processors storing instructions that, when executed by the one or more processors, cause the one or more processors to function as:
an acquisition unit configured to acquire specular reflection information having a value indicating a spread of specular reflection light for each pixel; and
a determination unit configured to determine a resolution level of illumination information to be used in rendering, based on the specular reflection information,
wherein the one or more processors determine, in a case where the value indicates a first spread, the resolution level as a first level, and determine, in a case where the value indicates a second spread smaller than the first spread, the resolution level as a second level higher than the first level,
wherein the specular reflection information is a map storing the value in a map format, and
wherein the determination unit determines the resolution level based on a ratio of a region in which the value is equal to or smaller than a threshold value to an entire region in the map.

2. The apparatus according to claim 1, wherein the determination unit determines, in a case where the ratio is a first ratio, the resolution level as a third level, and determines, in a case where the ratio is a second ratio smaller than the first ratio, the resolution level as a fourth level lower than the third level.

3. The apparatus according to claim 1,
wherein the determination unit determines the resolution level based on a minimum value of the value in the map.

4. The apparatus according to claim 1, wherein the determination unit performs a conversion of a resolution of the illumination information, in a case where the value indicates the first spread, and do not perform the conversion of the resolution of the illumination information, in a case where the value indicates the second spread.

5. The apparatus according to claim 1, wherein the determination unit determines, in a case where a maximum intensity of the specular reflection light is a first intensity, the resolution level as a fifth level, and determine, in a case where the maximum intensity is a second intensity smaller than the first intensity, the resolution level as a sixth level lower than the fifth level.

6. The apparatus according to claim 1, wherein the specular reflection information is an intensity map storing a maximum intensity of the specular reflection light in a map format, and
wherein the determination unit determines the resolution level based on a maximum value of the maximum intensity in the intensity map.

7. The apparatus according to claim 1, wherein the illumination information is an environment map storing illumination information in a two-dimensional image format.

8. The apparatus according to claim 7, wherein the determination unit determines, as the resolution level, a parameter to be used in conversion processing for conversion of a resolution of the environment map.

9. The apparatus according to claim 8, wherein the conversion processing is processing that converts an image size of the environment map, processing that decreases high-frequency information in the environment map, or compression processing accompanied by the conversion of the resolution of the environment map.

10. The apparatus according to claim 1, wherein the resolution level is information that specifies a conversion of a resolution of the illumination information.

11. A method comprising:
acquiring specular reflection information having a value indicating a spread of specular reflection light for each pixel; and
determining a resolution level of illumination information to be used in rendering, based on the specular reflection information,
wherein, in a case where the value indicates a first spread, the resolution level is determined as a first level, and in a case where the value indicates a second spread smaller than the first spread, the resolution level is determined as a second level higher than the first level,
wherein the specular reflection information is a map storing the value in a map format, and
wherein the resolution level is determined based on a ratio of a region in which the value is equal to or smaller than a threshold value to an entire region in the map.

12. The method according to claim 11,
wherein the resolution level is determined based on a minimum value of the value in the map.

13. The method according to claim 11, wherein the determining determines, in a case where the ratio is a first ratio, the resolution level as a third level, and determines, in a case where the ratio is a second ratio smaller than the first ratio, the resolution level as a fourth level lower than the third level.

14. The method according to claim 11,
wherein the specular reflection information is a map storing the value in a map format, and
wherein the determining determines the resolution level based on a minimum value of the value in the map.

15. The method according to claim 11, wherein the determining performs a conversion of a resolution of the illumination information, in a case where the value indicates the first spread, and do not perform the conversion of the resolution of the illumination information, in a case where the value indicates the second spread.

16. A non-transitory computer-readable storage medium storing instructions that, when executed by a computer, cause the computer to perform a method, the method comprising:
acquiring specular reflection information having a value indicating a spread of specular reflection light for each pixel; and
determining a resolution level of illumination information to be used in rendering, based on the specular reflection information,
wherein, in a case where the value indicates a first spread, the resolution level is determined as a first level, and in a case where the value indicates a second spread smaller than the first spread, the resolution level is determined as a second level higher than the first level,
wherein the specular reflection information is a map storing the value in a map format, and
wherein the resolution level is determined based on a ratio of a region in which the value is equal to or smaller than a threshold value to an entire region in the map.

17. The non-transitory computer-readable storage medium according to claim 16,
wherein the resolution level is determined based on a minimum value of the value in the map.

18. The non-transitory computer-readable storage medium according to claim 16, wherein the determining determines, in a case where the ratio is a first ratio, the resolution level as a third level, and determines, in a case where the ratio is a second ratio smaller than the first ratio, the resolution level as a fourth level lower than the third level.

19. The non-transitory computer-readable storage medium according to claim 16,
wherein the specular reflection information is a map storing the value in a map format, and
wherein the determining determines the resolution level based on a minimum value of the value in the map.

20. The non-transitory computer-readable storage medium according to claim 16, wherein the determining performs a conversion of a resolution of the illumination information, in a case where the value indicates the first spread, and do not perform the conversion of the resolution of the illumination information, in a case where the value indicates the second spread.

* * * * *